(12) United States Patent
Garbe et al.

(10) Patent No.: US 10,815,936 B2
(45) Date of Patent: Oct. 27, 2020

(54) FLEXIBLE BEARING ASSEMBLIES, ROCKET MOTORS INCLUDING SUCH ASSEMBLIES, AND METHODS OF FORMING FLEXIBLE BEARINGS

(71) Applicant: Northrop Grumman Innovation Systems, Inc., Plymouth, MN (US)

(72) Inventors: Duane J. Garbe, Mendon, UT (US); Edward L. Collins, Tremonton, UT (US); Allan P. Thompson, Tremonton, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 627 days.

(21) Appl. No.: 15/347,621

(22) Filed: Nov. 9, 2016

(65) Prior Publication Data
US 2018/0128209 A1    May 10, 2018

(51) Int. Cl.
| | |
|---|---|
| *F02K 9/86* | (2006.01) |
| *F02K 9/84* | (2006.01) |
| *B29C 65/48* | (2006.01) |
| *B29C 65/14* | (2006.01) |
| *F02K 9/97* | (2006.01) |
| *F02K 9/80* | (2006.01) |

(Continued)

(52) U.S. Cl.
CPC ............ *F02K 9/86* (2013.01); *B29C 65/1403* (2013.01); *B29C 65/48* (2013.01); *F02K 9/343* (2013.01); *F02K 9/80* (2013.01); *F02K 9/84* (2013.01); *F02K 9/97* (2013.01); *F02K 9/978* (2013.01); *B29L 2031/04* (2013.01); *F05D 2230/23* (2013.01); *F05D 2240/50* (2013.01)

(58) Field of Classification Search
CPC ..... F02K 9/80; F02K 9/84; F02K 9/86; F02K 9/97; F02K 9/978; F02K 9/343; F05D 2240/50

USPC ........................................................ 384/221
See application file for complete search history.

(56) References Cited

U.S. PATENT DOCUMENTS

| | | | |
|---|---|---|---|
| 3,392,918 A | 7/1968 | Goldberg | |
| 3,429,622 A | 2/1969 | Lee et al. | |
| 3,696,999 A | 10/1972 | Desjardins et al. | |

(Continued)

FOREIGN PATENT DOCUMENTS

| | | |
|---|---|---|
| CA | 1011124 | 5/1977 |
| GB | 1189052 | 4/1970 |

*Primary Examiner* — Todd E Manahan
*Assistant Examiner* — Kyle Robert Thomas
(74) *Attorney, Agent, or Firm* — TraskBritt (57) ABSTRACT

A flexible bearing assembly includes at least one metal end ring, a flexible bearing core having a plurality of layers of a resilient material between layers of a reinforcement material, and a phenolic composite material between and bonded to each of the at least one metal end ring and the flexible bearing core. A rocket motor assembly includes a chamber configured to contain a propellant and a movable thrust nozzle coupled to the chamber. The movable thrust nozzle includes a phenolic composite material between and bonded to each of a metal end ring and a flexible bearing core. Methods of forming a flexible bearing assembly include bonding a phenolic composite material to at least one metal end ring and bonding a flexible bearing core to the phenolic composite material. The flexible bearing core includes a plurality of layers of a resilient material between layers of a reinforcement material.

18 Claims, 4 Drawing Sheets

(51) Int. Cl.
  *F02K 9/34* (2006.01)
  *B29L 31/04* (2006.01)

(56) References Cited

U.S. PATENT DOCUMENTS

| | | | |
|---|---|---|---|
| 3,726,480 A | 4/1973 | Miltenberger | |
| 3,860,134 A | 1/1975 | Kobalter | |
| 3,941,433 A | 3/1976 | Dolling et al. | |
| 3,958,840 A * | 5/1976 | Hickox | F02K 9/84 384/129 |
| 4,263,243 A * | 4/1981 | Wilson | F02K 9/84 156/245 |
| 4,708,758 A | 11/1987 | McGregor | |
| H384 H | 12/1987 | Dillinger et al. | |
| 4,863,367 A | 9/1989 | McGregor | |
| 4,927,481 A * | 5/1990 | McGregor | B29C 43/203 156/245 |
| H1381 H | 12/1994 | Leavitt et al. | |
| H001381 H * | 12/1994 | Leavitt | 239/265.19 |
| 5,399,309 A | 3/1995 | Simmons | |
| 5,645,219 A * | 7/1997 | Miks | F02K 9/974 239/265.11 |
| 6,205,772 B1 | 3/2001 | Perrier et al. | |
| 7,559,723 B2 * | 7/2009 | Mohr | B63B 39/005 166/350 |
| 8,110,054 B2 * | 2/2012 | Litzenberger | B23K 1/16 156/73.5 |
| 8,276,361 B2 * | 10/2012 | Garbe | F02K 9/84 277/537 |
| 8,303,762 B2 | 11/2012 | Fay et al. | |
| 8,709,195 B2 | 4/2014 | Halladay | |
| 2008/0309023 A1 * | 12/2008 | Garbe | F02K 9/84 277/537 |
| 2009/0263676 A1 * | 10/2009 | Litzenberger | B23K 1/16 428/626 |
| 2010/0210745 A1 * | 8/2010 | McDaniel | C09D 5/008 521/55 |
| 2013/0189525 A1 | 7/2013 | Nolan et al. | |
| 2016/0084200 A1 | 3/2016 | Isaac et al. | |
| 2016/0245233 A1 | 8/2016 | Gajiwala et al. | |

* cited by examiner

FLEXIBLE BEARING ASSEMBLIES, ROCKET MOTORS INCLUDING SUCH ASSEMBLIES, AND METHODS OF FORMING FLEXIBLE BEARINGS

GOVERNMENT RIGHTS

This invention was made with government support under Contract Number NNM12AA70C awarded by the National Aeronautics and Space Administration (NASA). The government has certain rights in the invention.

FIELD

Embodiments of the present disclosure relate generally to flexible bearing assemblies, to rocket motors including such bearing assemblies, and to methods of forming flexible bearings.

BACKGROUND

Rocket motor assemblies generally include at least one containment vessel (e.g., a housing) having at least one propellant structure (e.g., a solid propellant grain) therein, and at least one thrust nozzle operatively associated with the containment vessel.

Rocket motor assemblies can also include flexible bearing assemblies operatively associated with the thrust nozzles thereof. A flexible bearing assembly may include a lamination of alternating flexible seals and rigid shims stacked and bonded together. Both the top and bottom layers may be an elastomer, and the lamination is positioned between and bonded to metallic end rings. One end ring may comprise the thrust nozzle ring of a rocket motor, and the other may comprise the rocket case mounting ring. The lamination may be laterally flexible, that is, in directions parallel to the layers. The lamination may have some axial flexibility (in the directions perpendicular to the layers), but preferably is stiffer in the axial direction than the lateral direction. Lateral movement of the flexible bearing assembly (e.g., by way of at least one actuator) may be used to modify the orientation of the thrust nozzle operatively associated therewith, so as to control the direction of the rocket motor assembly during use and operation (e.g., flight) of the rocket motor assembly.

Conventional flexible bearing assemblies are formed by heating and curing elastomeric material between the metallic end rings and the shims. Once the elastomeric material is cured, it provides material properties to allow the flexible bearing assembly to operate as described above. Bench testing may be used to verify proper movement of the flexible bearing assembly.

BRIEF SUMMARY

In some embodiments, a flexible bearing assembly includes at least one metal end ring, a flexible bearing core having a plurality of layers of a resilient material between layers of a reinforcement material, and a phenolic composite material between and bonded to each of the at least one metal end ring and the flexible bearing core.

In other embodiments, a rocket motor assembly includes a chamber configured to contain a propellant and a movable thrust nozzle coupled to the chamber. The movable thrust nozzle includes at least one metal end ring, a flexible bearing core having a plurality of layers of a resilient material between layers of a reinforcement material, and a phenolic composite material between and bonded to each of the at least one metal end ring and the flexible bearing core.

Methods of forming a flexible bearing assembly include bonding a phenolic composite material to at least one metal end ring and bonding a flexible bearing core to the phenolic composite material. The flexible bearing core includes a plurality of layers of a resilient material between layers of a reinforcement material.

DETAILED DESCRIPTION

The illustrations presented herein are not actual views of any particular flexible bearing or assembly, but are merely idealized representations that are employed to describe example embodiments of the present disclosure. Additionally, elements common between figures may retain the same numerical designation.

The following description provides specific details, such as material types, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing a structure or assembly. The structures described below may not form complete assemblies. Only those process acts and structures necessary to understand the embodiments of the disclosure are described in detail below. Additional acts to form the complete assembly from various structures may be performed by conventional fabrication techniques. Also note, any drawings accompanying the application are for illustrative purposes only, and are thus not drawn to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

Figure 1:
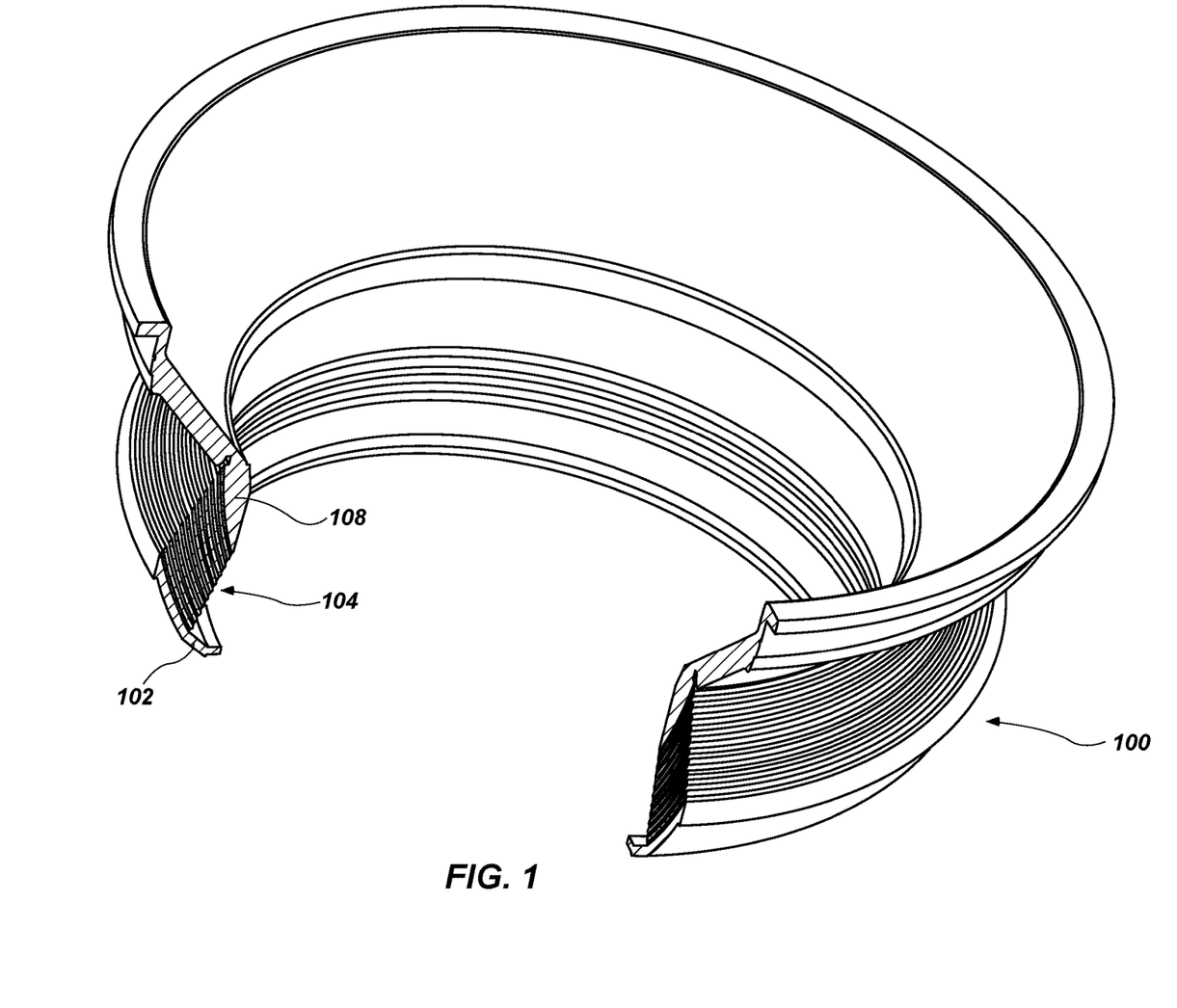
FIG. 1 is a simplified cut-away perspective view of a movable thrust nozzle including a flexible bearing assembly in accordance with an embodiment of the disclosure.

FIG. 1 is a cut-away perspective view of a flexible bearing assembly 100, which may be a nozzle assembly. The flexible bearing assembly 100 may include a first end ring 102, a flexible bearing core 104 coupled to the first end ring 102, and a second end ring 108 coupled to the flexible bearing core 104. In some embodiments, the second end ring 108 may be fixed with respect to a rocket motor, and may be formed of a metal material (e.g., steel) or another selected material (e.g., a composite material). The flexible bearing core 104 may circumscribe a portion of the second end ring 108. The first end ring 102 may define a portion of an exit nozzle of a rocket motor.

Figure 2:
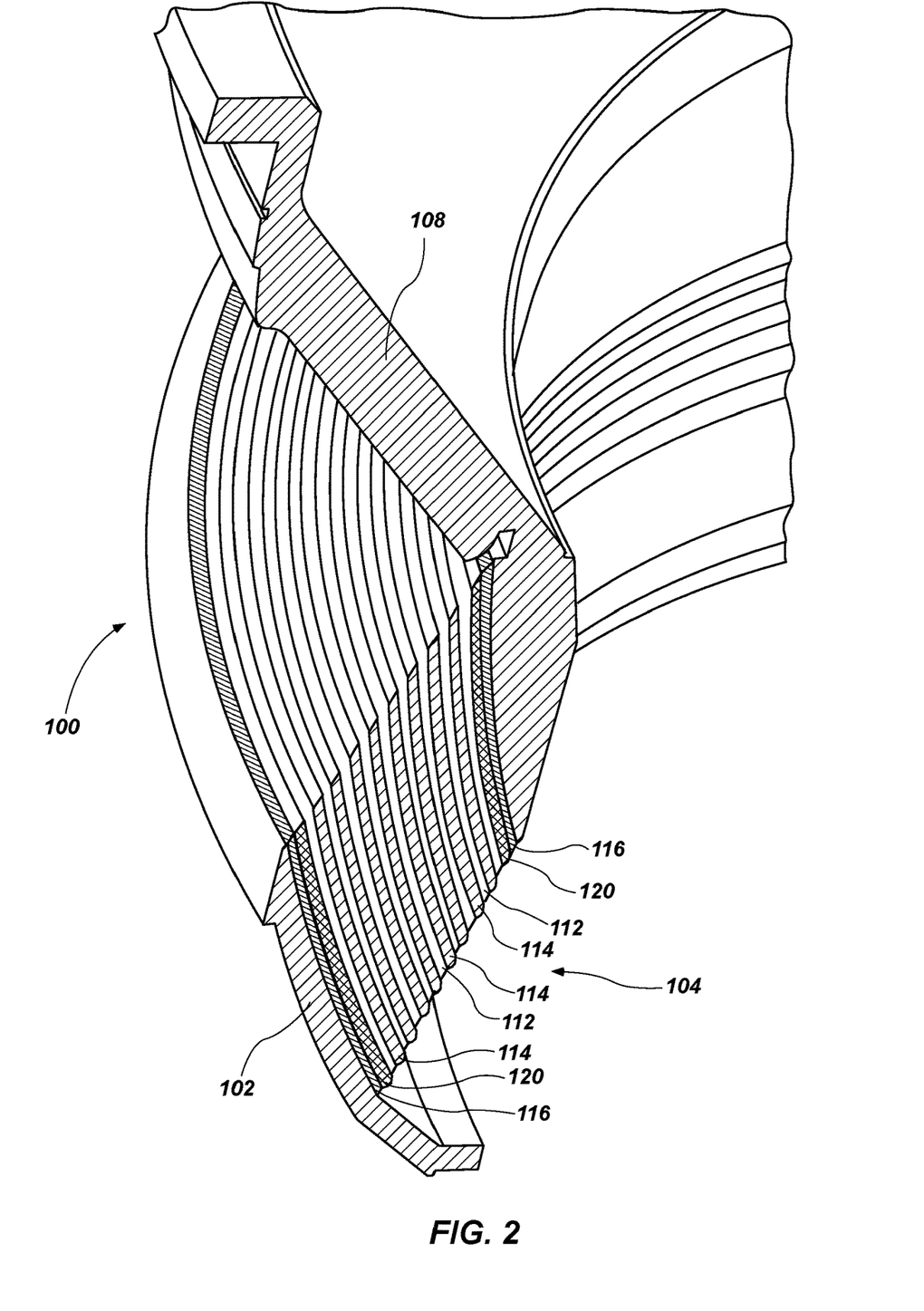
FIG. 2 is an expanded view showing a portion of the nozzle assembly of FIG. 1 in more detail.

FIG. 2 is an expanded view showing the flexible bearing assembly 100 and the flexible bearing core 104 in more detail. The flexible bearing core 104 may include a plurality of layers of a resilient material 112 between layers of a reinforcement material 114. That is, the flexible bearing core 104 may be a lamination including an alternating sequence of flexible structures (the resilient material 112) and rigid structures (the reinforcement material 114). The resilient material 112 may include a polymeric material, such as an elastomer formulated to deform when subjected to a load.

The reinforcement material 114 may be in the form of shims disposed in a nested arrangement. The layers of the reinforcement material 114 may have surfaces corresponding to portions of concentric spheres. The reinforcement material 114 may be, for example, a composite formed of glass (e.g., a glass fabric) and phenolic resin, and may be formulated to withstand extreme temperatures. Reinforcement materials and resilient materials in flexible bearings are described in, for example, U.S. Patent Application Publication 2016/0245233A1, "Methods of Forming Flexible Structures for a Rocket Motor Assembly, Related Flexible Structures, and Related Assemblies Including the Flexible Structures," published Aug. 25, 2016, the entire disclosure of which is incorporated herein by reference.

Each of the layers of the resilient material 112 of the flexible bearing core 104 may be independently formed of and include crosslinked polysiloxane chains formed from one or more silicone materials according to the methods described in U.S. Patent Application Publication 2016/0245233A1. In some embodiments, the layers of the resilient material 112 may be formed simultaneously in a mold with the reinforcement material 114. The resilient material 112 may include crosslinked polysiloxane chains formed from one or more silicone materials.

Because the resilient material 112 may deform when subjected to a load, the layers of the reinforcement material 114 may move slightly with respect to one another, with the net result that the first end ring 102 may move relative to the second end ring 108. Various means, as known to those of ordinary skill in the art, may be configured to apply loads to the flexible bearing core 104 and/or the first end ring 102 to dynamically change the position of the first end ring 102, and thus, the orientation of an axis through the first end ring 102 with respect to the second end ring 108. For example, if the flexible bearing assembly 100 is a nozzle assembly of a rocket motor, changing the position of the first end ring 102 may change the direction of thrust of the rocket motor. Loads may be applied to the change the position of the first end ring 102 by mechanical devices (e.g., pistons), secondary nozzles, or any other means. As an example, loads may be applied as described in U.S. Statutory Invention Registration H384, "Stowable Three-Axis Reaction-Steering System," published Dec. 1, 1987, or U.S. Pat. No. 3,392,918, "Rocket Motor Thrust Control System," granted Jul. 16, 1968, the entire disclosure of each of which are incorporated herein by reference.

The flexible bearing core 104 may be coupled to the first end ring 102 and/or the second end ring 108 by an adhesive 116. The adhesive 116 may secondarily bond the flexible bearing core 104 to the first end ring 102 and/or the second end ring 108, such that the flexible bearing core 104 may be formed before bonding to the first end ring 102 and/or the second end ring 108. In some embodiments, the adhesive 116 may include a different material than the resilient material 112. For example, the adhesive 116 may include a phenolic resin.

In some embodiments, a phenolic composite material 120 may be placed between the flexible bearing core 104 and the first end ring 102 and/or the second end ring 108. The phenolic composite material 120 may be a material formulated to bond with the first end ring 102 and/or the second end ring 108 and the flexible bearing core 104 via the adhesive 116. In certain embodiments, the phenolic composite material 120 may contain a material to promote bonding of the flexible bearing core 104 to the first end ring 102 and/or the second end ring 108. For example, the phenolic composite material 120 may include carbon fibers, such that the adhesive 116 and the phenolic composite material 120 may together form a composite material.

In certain embodiments, the phenolic composite material 120 is omitted, and the adhesive 116 itself is formulated to bond to both the flexible bearing core and the end rings 102, 108. For example, in such embodiments, the adhesive 116 may include carbon fibers and a phenolic polymeric resin.

Figure 3:
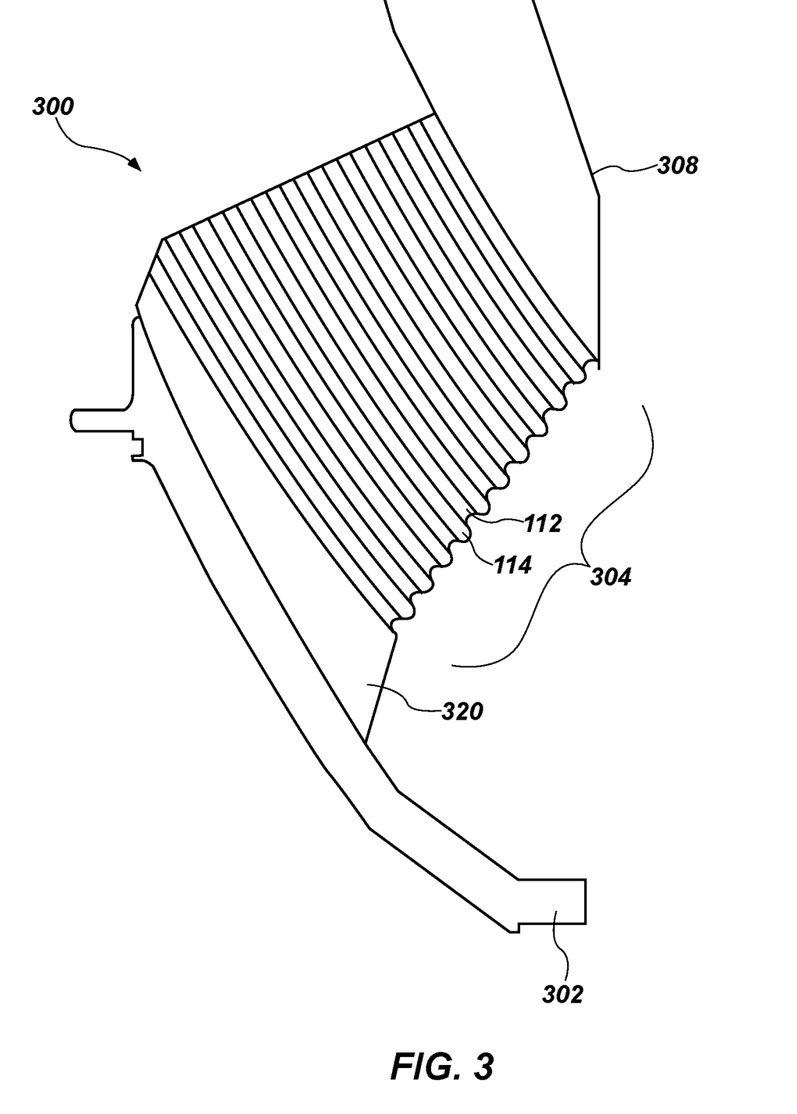
FIG. 3 is a partial cross-sectional view of another nozzle including a flexible bearing assembly according to an embodiment of the disclosure.

The phenolic composite material 120 is depicted in FIG. 2 as having a shape similar to the layers of the reinforcement material 114 (e.g., shims in the shape of concentric cylinders). However, the phenolic composite material 120 may have any selected shape. FIG. 3 illustrates another nozzle assembly 300 in which a phenolic composite material 320 has a wedge shape when viewed in cross-section. The dimensions of the phenolic composite material 320 may be selected to couple a flexible bearing core 304 to a first end ring 302 or a second end ring 308 having a different shape than the flexible bearing core 304 (wherein the flexible bearing core 304 may include a plurality of layers of a resilient material 112 between layers of a reinforcement material 114 as discussed above with respect to FIG. 2). For example, the phenolic composite material 320 may be designed to couple a flexible bearing core 304 and nozzle end ring 308 having a new design to an existing forward end ring 302 (which may have dimensions constrained by the dimensions of existing rocket motor hardware). Thus, the new designs may be manufactured and tested using existing tooling, without the cost and time required to fabricate new tooling. Because the phenolic composite material 320 may be bonded after the flexible bearing core 304 is formed, the end rings 302, 308 need not be in place adjacent the flexible bearing core 304 while the resilient material 112 thereof is cured or otherwise processed.

Figure 4:
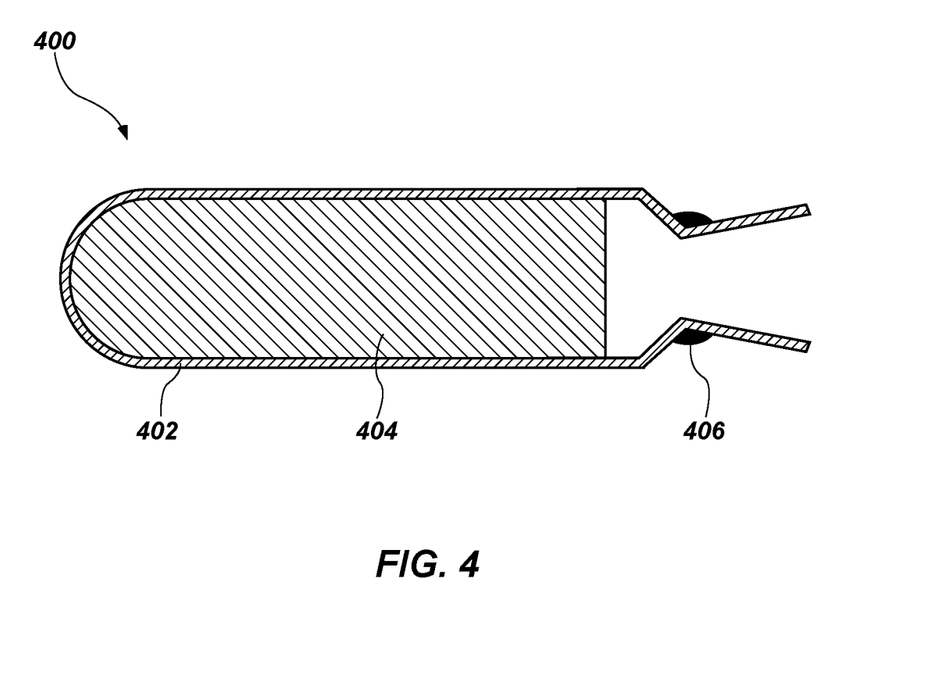
FIG. 4 is a simplified schematic view of a rocket motor assembly including a nozzle having a flexible bearing assembly according to an embodiment of the disclosure.

FIG. 4 shows a simplified cross-sectional view of a rocket motor assembly 400, which includes a chamber 402 configured to contain a propellant 404. The propellant 404 may be, for example, a solid propellant or a liquid propellant. A movable thrust nozzle 406 may be coupled to the chamber 402, such that exhaust gases formed from the burning propellant 404 escape the chamber 402 through the movable thrust nozzle 406. The movable thrust nozzle 406 may include a flexible bearing assembly as shown in any of FIGS. 1-3. The rocket motor assembly 400 may be coupled to other components as shown in the art, such as sensors, telemetry systems, warheads, fins, etc., to form a complete rocket motor.

In some embodiments, a method of forming a flexible bearing assembly 100 (see FIGS. 1 and 2) includes bonding a phenolic composite material 120 to at least one metal end ring 102 and bonding a flexible bearing core 104 to the phenolic composite material 120. These bonding operations may be performed in any order, or may be performed simultaneously.

As discussed above and shown in FIG. 2, the flexible bearing core 104 may include a plurality of layers of a resilient material 112 between layers of a reinforcement material 114. The method may include forming the plurality of layers of the resilient material 112 between the layers of the reinforcement material 114 to form the flexible bearing core 104. An adhesive bond may be formed between the layers of the reinforcement material 114 and the resilient material 112, such as by placing a precursor to the resilient material 112 in contact with the reinforcement material 114 and curing the precursor to form the resilient material 112. For example, a polymeric material may be crosslinked to form the resilient material 112 and bond the resilient material 112 to the reinforcement material 114, as described in U.S. Patent Application Publication 2016/0245233 A1, previously incorporated by reference.

The plurality of layers of the resilient material 112 may be formed between the layers of the reinforcement material 114 before bonding the phenolic composite material 120 to the end ring 102 or before bonding the flexible bearing core 104 to the phenolic composite material 120. In either case, the end ring 102 need not be a part of the flexible bearing assembly 100 until after the resilient material 112 is formed. The phenolic composite material 120 may be bonded to the end ring 102 prior to or subsequent to bonding the flexible bearing core 104 to the phenolic composite material 120.

Because the flexible bearing core 104 may be formed separately from the end rings 102, 108, certain non-destructive evaluations may be carried out on the flexible bearing core 104 before the flexible bearing core 104 is secured to the end rings 102, 108. For example, the flexible bearing core 104 may be examined by subjecting it to high-energy radiation, such as X-ray radiation, which evaluation can be complicated by the presence of metal end rings 102, 108 bonded to flexible bearing cores 104 (e.g., because the metal of the end rings 102, 108 may block or scatter the signal, making less radiation available to identify defects in flexible bearing core 104). The flexible bearing core 104 may also be visually inspected without interference from the end rings 102, 108. The ability to inspect flexible bearing core 104 may limit or eliminate the need for bench testing of completed flexible bearing assemblies 100, which can be expensive and time-consuming.

In the event that a flexible bearing core 104 fails inspection, a different flexible bearing core 104 of the same size and configuration, and which has passed inspection, can be substituted before bonding to the end rings 102, 108. Thus, methods in which the flexible bearing core 104 is formed separate from the end rings 102, 108 and secondarily bonded to the end rings may yield flexible bearing assemblies 100 having greater reliability than conventional methods.

Furthermore, a secondary bond between the resilient material 112 and the metal end rings 102, 108 may be relatively stronger and more robust than the bond between flexible bearing cores and end rings in conventional assemblies. Therefore, secondarily bonding flexible bearing cores 104 may involve less operational risk than conventional methods.

By simplifying the manufacturing and assembly of flexible bearing assemblies 100 (e.g., as in nozzles), flexible bearing cores 104 as disclosed herein may be designed with an eye toward optimizing performance of the cores themselves, rather than fitting within certain manufacturing constraints. In forming flexible bearing assemblies 100 by conventional methods, molds and other tooling are typically formed large enough to accommodate the typically metallic end rings 102, 108. Furthermore, the end rings 102, 108 may, undesirably, act as heat sinks. By removing the end rings 102, 108 from the molding process, the molds may be smaller (and therefore less expensive and labor-intensive to produce and use), and the flexible bearing cores 104 may be processed or cured more quickly, without heating and cooling the end rings 102, 108. The overall manufacturing process of the flexible bearing cores 104 and any larger assemblies containing flexible bearing cores 104 (e.g., nozzle assemblies, rocket motor assemblies) may be faster and cheaper than conventional methods.

Another benefit of the methods disclosed herein is that the end rings 102, 108 may not be exposed to a heated cure cycle typically used to form or cure the resilient material 112 of the flexible bearing cores 104. Such cure cycles can change the mechanical properties and/or the physical dimensions of the end rings 102, 108.

Though described with respect to movable thrust rocket motor nozzles, the flexible bearing cores 104 and related methods may be used for any flexible bearing. For example, flexible bearings in helicopter rotor assemblies and wellhead assemblies may also be fabricated as disclosed.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various types and configurations of flexible bearing structures.

What is claimed is:

1. A rocket motor assembly, comprising:
    a movable thrust nozzle, comprising:
        a first metal end ring;
        a second metal end ring;
        a flexible bearing core comprising a plurality of layers of a resilient material between layers of a reinforcement material, the flexible bearing core disposed between the first metal end ring and the second metal end ring;
        a first phenolic composite material disposed between and bonded to each of the first metal end ring and a first layer of resilient material of the flexible bearing core, wherein the first phenolic composite material has a wedge-shaped cross-section; and
        a second phenolic composite material disposed between and bonded to each of the second metal end ring and a second layer of resilient material of the flexible bearing core, wherein the second phenolic composite material has a cross-sectional shape at least substantially matching cross-sectional shapes of the layers of a reinforcement material.

2. The rocket motor assembly of claim 1, wherein the first metal end ring comprises steel.

3. The rocket motor assembly of claim 1, wherein the resilient material comprises an elastomer.

4. The rocket motor assembly of claim 1, wherein the reinforcement material comprises glass and a phenolic resin.

5. The rocket motor assembly of claim wherein the plurality of layers of the resilient material each comprise surfaces partially defining concentric spheres.

6. A rocket motor assembly, comprising:
    a chamber configured to contain a propellant; and
    a movable thrust nozzle coupled to the chamber, the movable thrust nozzle comprising:
        a first metal end ring;
        a second metal end ring;
        a flexible bearing core comprising a plurality of layers of a resilient material between layers of a reinforcement material, the flexible bearing core disposed between the first metal end ring and the second metal end ring;
        a first phenolic composite material disposed between and bonded to each of the first metal end ring and a first layer of resilient material of the flexible bearing core, wherein the first phenolic composite material has a wedge-shaped cross-section;
        a second phenolic composite material disposed between and bonded to each of the second metal end ring and a second layer of resilient material of the flexible bearing core; and
        an adhesive comprising a phenolic polymeric material and carbon fibers disposed between the first phenolic composite material and the first metal end ring and between the second phenolic composite material and the second metal end ring, the adhesive forming a composite material with both the first phenolic composite material and the second phenolic composite material.

7. The rocket motor assembly of claim 6, wherein the first metal end ring is fixed in relation to the chamber.

8. The rocket motor assembly of claim 6, wherein one of the first metal end ring and the second metal end ring is capable of moving relative to the other by deformation of at least one of the layers of the resilient material.

9. The rocket motor assembly of claim 6, further comprising a solid propellant within the chamber.

10. A method of forming a rocket motor assembly, comprising:
    forming a movable thrust nozzle, comprising the steps:
        bonding a first phenolic composite material to a first metal end ring,
        bonding a second phenolic composite material to a second metal end ring; and
        bonding a flexible bearing core to the first and second phenolic composite materials, the flexible bearing core comprising a plurality of layers of a resilient material between layers of a reinforcement material, wherein bonding the first phenolic composite material to the first metal end ring and bonding the second phenolic composite material to the second metal end ring occurs prior to bonding the flexible bearing core to the first and second phenolic composite materials,
    wherein the first phenolic composite material has a wedge-shaped cross-section, and
    wherein the second phenolic composite material has a cross-sectional shape at least substantially matching cross-sectional shapes of the layers of a reinforcement material.

11. The method of claim 10, further comprising forming the flexible bearing core by forming the plurality of layers of the resilient material between the layers of the reinforcement material.

12. The method of claim 11, wherein forming the plurality of layers of the resilient material between the layers of the reinforcement material comprises forming an adhesive bond between the resilient material and the reinforcement material.

13. The method of claim 11, wherein forming the plurality of layers of the resilient material between the layers of the reinforcement material comprises crosslinking a polymeric material to form the resilient material.

14. The method of claim 11, wherein forming the plurality of layers of the resilient material between the layers of the reinforcement material comprises forming the plurality of layers of the resilient material between the layers of the reinforcement material before at least one of bonding the first phenolic composite material to the first metal end ring, bonding the second phenolic composite material to the second metal end ring, or bonding the flexible bearing core to the first and second phenolic composite materials.

15. The method of claim 10, further comprising non-destructively evaluating the flexible bearing core before at least one of bonding the first phenolic composite material to the first metal end ring, bonding the second phenolic composite material to the second metal end ring, or bonding the flexible bearing core to the first and second phenolic composite materials.

16. The method of claim 15, wherein non-destructively evaluating the flexible bearing core comprises exposing the flexible bearing core to high-energy radiation.

17. The method of claim 16, wherein exposing the flexible bearing core to high-energy radiation comprises exposing the flexible bearing core to X-ray radiation.

18. The method of claim 10, further comprising coupling at least one of the first metal end ring and the second metal end ring to a chamber containing a propellant.

\* \* \* \* \*

UNITED STATES PATENT AND TRADEMARK OFFICE
CERTIFICATE OF CORRECTION

PATENT NO. : 10,815,936 B2  
APPLICATION NO. : 15/347621  
DATED : October 27, 2020  
INVENTOR(S) : Duane J. Garbe, Edward L. Collins and Allan P. Thompson Page 1 of 1

It is certified that error appears in the above-identified patent and that said Letters Patent is hereby corrected as shown below:

In the Specification

| | | | |
|---|---|---|---|
| | Column 4, | Line 10, | change "2016/0245233A1, "Methods" to --2016/0245233 A1, "Methods-- |
| | Column 4, | Lines 19-20, | change "2016/0245233A1. In" to --2016/0245233 A1. In-- |

In the Claims

| | | | |
|---|---|---|---|
| Claim 5, | Column 7, | Line 49, | change "of claim wherein" to --of claim 1, wherein-- |
| Claim 10, | Column 8, | Line 23, | change "comprising the steps:" to --comprising:-- |
| Claim 10, | Column 8, | Line 25, | change "end ring," to --end ring;-- |

Signed and Sealed this  
Twenty-ninth Day of December, 2020

Andrei Iancu  
*Director of the United States Patent and Trademark Office*